Patented Aug. 14, 1951

2,564,191

UNITED STATES PATENT OFFICE 2,564,191

CERTAIN OXYALKYLATED DERIVATIVES OF DIFUNCTIONAL BIS-PHENOL ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application January 3, 1949, Serial No. 69,064

7 Claims. (Cl. 260—51)

The present invention is concerned with certain new chemical products, compounds, or compositions, which have use in various arts. This invention is a continuation-in-part of our copending application Serial No. 734,211, filed March 12, 1947, now abandoned. It includes methods or procedures for manufacturing said new chemical products, compounds, or compositions, as well as the products, compounds, or compositions themselves. Said new compositions are hydrophile synthetic products; said hydrophile synthetic products being oxyalkylation products of:

(A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin derived by reaction between an aldehyde and a difunctional bis-phenol reactive towards aldehydes; said oxyalkylation resin being characterized by the introduction into the resin molecule of a plurality of divalent radicals having the formula $(RO)n$, wherein R is a member selected from the class consisting of ethylene radicals, propylene radicals, butylene radicals, hydroxypropylene radicals and hydroxybutylene radicals; and $n$ is a numeral varying from 1 to 20; with the proviso that at least two moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 69,063, filed January 3, 1949, now abandoned.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

Briefly stated, the new chemical compounds herein contemplated, and particularly for use as demulsifiers, are obtained by oxyalkylation of certain thermoplastic solvent-soluble resins. Such resins are obtained from certain peculiar difunctional phenols of the kind characterized by the descriptive name of bis-phenols. Such bis-phenols are polycyclic and polyhydric.

It is customary to produce solvent-soluble thermoplastic phenol-aldehyde resins, particularly for use in the varnish trade, from a variety of difunctional phenols. Such difunctional phenols are characterized by having a substituent, usually alkyl in nature, in either the ortho or para position. Common phenols illustrating this particular type, are para-butyl phenol, para-amyl phenol, para-phenyl phenol, para-benzyl phenol, etc. They are converted into thermoplastic solvent-soluble resins by the use of a variety of aldehydes, particularly formaldehyde.

As to the manufacture of such resins, attention is directed to a very satisfactory procedure described in U. S. Patent No. 2,330,217, dated September 28, 1943, to Hunn. The methods employed in manufacturing such resins are identical with those employed in the manufacture of ordinary phenol-formaldehyde resins, in that either acid or alkaline catalyst may be employed. The procedure usually differs from that employed in the manufacture of ordinary phenol-aldehyde resins, in that phenol, being water-soluble, reacts readily with an aqueous solution without further difficulty. When, however, a water-insoluble phenol is employed, it is obvious that some modification must be adopted to increase the interfacial surface, and thus cause reaction to take place. A common solvent is sometimes employed. Another procedure involves nothing more nor less than rather severe agitation, so as to create a large interfacial area. Once the reaction starts to a moderate degree, it is possible that both reactants are somewhat soluble in the partially reacted mass and assist in hastening the reaction.

Another advantage in the manufacture of the thermoplastic type of resin, is that since a difunctional phenol is employed, an excess of an aldehyde, for instance, formaldehyde, may be employed without too marked a change in conditions of reaction and ultimate product. There is no marked advantage, however, in using an excess over and above the stoichiometric proportions, for the reason that such excess may be lost and wasted. For all practical purposes, the molar ratio of formaldehyde to phenol may be limited to the molar ratio of 0.9 to 1.2 with 1.05 as the preferred ratio, or sufficient, at least theoretically, to convert both terminal hydrogen atoms, as afterwards described. Sometimes when higher aldehydes are used, the excess of aldehydic reactant can be distilled off, and thus recovered from the reaction mass. This same procedure may be used with formaldehyde and the excess reactant recovered.

Although any conventional procedure ordinarily employed may be used in the manufacture of the herein contemplated resins, we have found it particularly desirable to use the aforementioned Hunn procedure, or that described in U. S. Patent No. 2,373,058, dated April 3, 1945, to Silberkraus.

Attention is directed to the fact that another procedure which may be employed in the manufacture of thermoplastic and soluble phenolaldehyde resins from difunctional phenols, such as ortho- or para-decyl phenol or ortho- or para-dodecyl phenol, is illustrated in U. S. Patent No. 2,380,192, dated July 10, 1945, to Schlaanstine et al.

Broadly speaking, bis-phenols have the general formula:

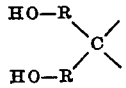

wherein R is an aryl group and the free bonds are linked with alkyl groups or an alkylene radical. They are commonly prepared by reacting a phenol, e. g., phenol, o-cresol, etc., with a ketone such as acetone, methyl-ethyl-ketone, dibenzyl ketone, cyclohexanone, etc., in the presence of a concentrated, strong mineral acid, such as sulfuric or hydrochloric acid. See U. S. Patent No. 2,182,308, dated December 5, 1939, to Britton et al.

Further variety of bis-phenols are also described in the following three patents: U. S. Patents Nos. 1,986,423, dated January 1, 1935, to Arvin; 2,331,265, dated October 5, 1943, to Colemann et al.; and 2,359,242, dated September 26, 1944, to Perkins et al.

The formula for the most common bis-phenol, to wit, bis-phenol A, is the following:

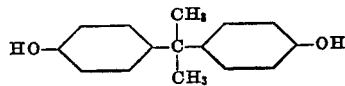

If, however, instead of using phenol, one employs an ortho-substituted phenol, such as orthocresol, an ortho-ethyl phenol, orthochloro phenol, orthophenyl phenol, then the resultant product, instead of being tetrafunctional, is a difunctional compound, insofar that in each cyclic nucleus there is only one ortho hydrogen atom available for reaction, and obviously, no parahydrogen atom. This is illustrated by the following formulae:

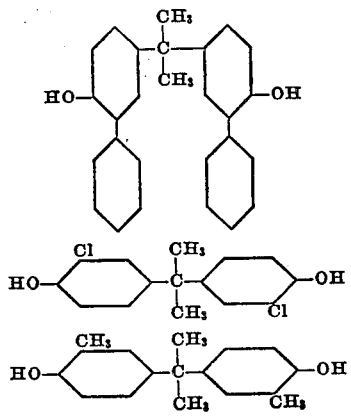

Note, for instance, that the manufacture of such difunctional bis-phenol is described in the abovementioned Patent No. 2,182,308. Other compounds are obtained from other substituted phenols, such as ortho-ethyl phenol, orthopropyl phenol, etc. As to the ketone residue, it is to be noted that one need not employ acetone, but as pointed out, for example, in the aforementioned U. S. Patent No. 2,182,308, any ketone such as acetone, methylethylketone, diethylketone, dibutylketone, cyclohexanone, may be employed.

Having obtained a suitable thermoplastic solvent-soluble resin, the second step is the procedure of subjecting such resin to the action of an oxyalkylating agent, such as ethylene oxide, so as to yield a resin derivative, which is hydrophile and even water-soluble. Since each phenolic nucleus in reality consists of two phenolic radicals, it is obvious that if desired, the resin could be treated so as to render one nucleus unreactive by conversion, for example, into an ether, and adding the repetitious alkylene oxide chain to the other nucleus. Another variant would include the procedure, wherein, after initial oxyalkylation of both hydroxyls in each polycyclic nucleus, one would then render one terminal alkanol radical unreactive by esterification or etherization. However, our preference is simply to subject the resin to oxyalkylation in the manner hereinafter described in detail. For this reason, the text immediately following will be concerned with the preparation of specific examples, so as to illustrate resin manufacture.

RESIN

Example 1

This was prepared from the bis-phenol derived from orthocresol and acetone referred to in the trade as "Bis-Phenol C." The formula, as previously noted, is as follows:

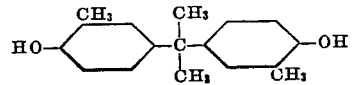

| | Pounds |
|---|---|
| Bis-phenol C (½ pound mole) | 128 |
| Formaldehyde (½ pound mole) | 42 |
| Hydrochloric acid concentrated | 1.5 |
| Sodium salt of dodecyl toluene sulfonic acid | 5 |
| Xylene | 50 |

The procedure employed represents essentially that described in the aforementioned Hunn Patent No. 2,330,217, with certain minor modifications which are purely a matter of convenience. Insofar that the bis-phenol C has a fairly high melting point, the xylene was added as an initial step and the mixture heated to 130° C. so as to give a solution or homogeneous mixture which could be handled more readily. The catalyst was then added to the bis-phenol C-xylene mixture. The emulsifying agent (sodium salt of dodecyl toluene sulfonic acid) was dissolved in the formaldehyde. Following the general procedure of the aforementioned Hunn patent, one can usually add the aldehyde in a single portion and subsequently cause reaction by increasing the temperature. In such procedure, the aldehyde is added in a single portion and at room temperature. The reaction is controlled by careful increase in temperature. However, in handling the bis-phenols, due to their higher melting point, it is necessary to vary the procedure, because the reaction mass or mixture, or the bis-phenol and xylene, for example, is usually held at about 130° C. or thereabouts, but in any event, a temperature sufficiently high that the mixture of the bis-phenol and the solvent is clearly liquid.

In light of such higher temperature, it is necessary to add the aldehyde solution in a very small stream, so that the reaction is controlled by virtue of the addition of the reactant, rather than by slow temperature increase.

After all the aldehyde has been added, which may require from 30 minutes to several hours, the reaction mass is refluxed with constant stirring, so as to give the typical creamy state described in the aforementioned patent to Hunn. The refluxing temperature is lower than the temperture of initial reaction, previously pointed out, for the obvious reason that it is determined by the water present, particularly when formaldehyde is used, and thus represents approximately 100° C. or thereabouts.

During this refluxing stage, particularly in light of the reduced temperature, the creamy mass thickens and this is also true in light of the fact that both the phenolic reactant as such and the final resin is apt to be harder than a comparable resin obtained from para-amyl phenol or parabutyl phenol. For this reason, it is necessary to add more solvent during the refluxing stage, so as to keep the creamy mixture sufficiently thin. The amount required in the instant example is about 75 pounds more of xylene.

At the end of the refluxing stage, which should be indicated by substantially complete disappearance of the aldehyde such as formaldehyde, the next step involves the dehydration of the initial reaction mass. In this detail also there is a variation from the method of the aforementioned Hunn patent, insofar that we prefer to obtain dehydration by the use of the solvent present, i. e., xylene, and also as a rule, prefer to leave part of the solvent in the finished residue, as a matter of convenience. For this reason, at the completion of the reflux stage, the switch is made from a reflux condenser without a trap, to one with a trap arrangement, in which, as the vapors are condensed, water is removed and the xylene returned to the reaction vessel for the recirculation for the refluxing. Following this precdure, approximately 36 pounds of water, which correspond to theoretical yield based on water of oxidation and water of reaction, are removed from the condenser trap. After removal of water and as resinification nears completion, the resin may show a lessened solubility in xylene, or else an undesirable increase in viscosity. For this reason, we prefer to add a solvent which will reduce the viscosity somewhat and give a better solution or more homogeneous mixture. Our preference is to add 50 pounds of diethyl Carbitol (diethyleneglycol diethylether). The final diluted resin so obtained contains slightly less than 45% resin and slightly more than 55% solvent. If desired, of course, the solvent can be evaporated, yielding a hard, dark amber resin, having a melting point of 100°–110° C. However, insofar that the present invention is not concerned with the resin per se, but with oxyalkylated derivatives thereof, it is more convenient to prepare a solution of the resin and subject such solution to oxyethylation, with the proviso, of course, that the solvents are inert towards oxyethylation and would not cause any unduly high pressure during the reaction.

Other aryl sulfonic acids or salts may be used instead of dodecyl toluene sulfonic acid. One may employ monoalkyl ($C_{10}$–$C_{20}$, principally $C_{12}$–$C_{14}$) benzene monosulfonic acid sodium salt. (Examples of alkylaryl sulfonic acids which serve as catalysts and as emulsifiers particularly in the form of sodium salts include the following:

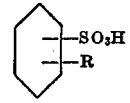

(R is an alkyl hydrocarbon radical having 12–14 carbon atoms.

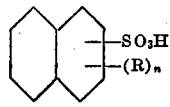

(R is an alkyl radical having 3–12 carbon atoms and $n$ represents the numeral 3, 2, or 1, usually 2, in such instances where R contains less than 8 carbon atoms.)

RESIN

*Example 2*

This particular resin is analogous to the prior resin exemplified by Example 1, preceding, but is obtained by the use of acetaldehyde instead of formaldehyde. The formula employed is as follows:

| | Pounds |
|---|---|
| Bis-phenol C (½ pound mole) | 128 |
| Acetaldehyde (½ pound mole) | 22 |
| H₂SO₄ | 1 |
| Xylene | 50 |

Due to the fact that this example employs a water-insoluble acetaldehyde, it is more convenient to follow the procedure of the aforementioned Silberkraus Patent No. 2,373,058. The bis-phenol C and xylene were heated to 150° C. so as to give a uniform mixture, for the same reasons indicated under Example 1, preceding. As soon as the mixture was uniform, the sulfuric acid was added and stirring continued. The acetaldehyde was mixed with an additional 50 pounds of xylene, and this mixture was added slowly. It is to be noted that this addition of the solvent to the acetaldehyde is a modification of the procedure described in the aforementioned Silberkraus Patent No. 2,373,058. The reaction mass was then refluxed for one hour or longer to be certain that the aldehyde had reacted completely. When the reaction was completed, approximately seven to eight pounds of water were distilled off, using the usual procedure which involved connection with a water trap. This arrangement is the same as described in the preceding example. The finished resin contained approximately one-third xylene and yielded a resin similar in appearance to that described in the preceding example, but somewhat softer.

RESIN

*Example 3*

| | Pounds |
|---|---|
| Bis-phenol C (½ pound mole) | 128 |
| Heptaldehyde (½ pound mole) | 57 |
| H₂SO₄ | 1 |
| Xylene | 50 |

The same procedure was followed as in Example 2, preceding, except that 50 pounds of xylene were now added to the heptaldehyde, for the reason that the heptaldehyde is less reactive and less volatile, but the 50 pounds of xylene were added before removing the water and before the reaction mass cooled, so the final product represented the addition of approximately the same amount of xylene as in Example 1 preceding.

RESIN

*Example 4*

|  | Pounds |
|---|---|
| Bis-phenol C | 75 |
| Xylene | 50 |
| $H_2SO_4$ | 1 |
| Butyraldehyde | 21 |

The procedure followed in this instance was exactly the same as in Example 3, preceding, which includes the addition of a second lot of 50 pounds of xylene. The final resin solution obtained represented 50% resin and 50% xylene. If desired, the second batch of xylene need not be added, or, at the most, some fraction theerof, so as to obtain a resin solution having approximately the same solvent content as the previous example, i. e., approximately one-third solvent and two-thirds resin.

RESIN

*Example 5*

The same procedure is employed as in the preceding four examples, except that a different phenolic reactant is employed. Reference has been made previously to bis-phenols obtained from orthophenyl phenol, orthochlorophenol, orthoethyl phenol, and orthopropyl phenol. Such ortho phenols can be reacted with acetone in the manner described in some of the previous patents enumerated which are concerned with the manufacture of bis-phenols, for instance, above mentioned U. S. Patent No. 2,182,308. Similarly, a variety of phenolic reactants can be obtained by using a ketone other than acetone, for instance, orthocresol or number of the other phenols mentioned can be reacted with methylethyl ketone, dibenzyl cyclohexanone, etc. This has been pointed out previously in connection with patents concerned with the manufacture of bis-phenols. Likewise, one can prepare bis-phenols by using a mixture of phenols, for instance, ortho-cresol and ortho-ethyl phenol; in such a mixture a portion of the bis-phenols obtained as a result of reaction would, of course, represent a type in which two dissimilar phenolic nuclei are attached to the same ketone resin.

However, due to the fact that bis-phenol C is the cheapest and most readily available difunctional bis-phenol, it is our preference to use this particular product, and particularly in conjunction with the various aldehydes described, particularly aliphatic aldehydes having not over 7 carbon atoms, with octylaldehyde representing the highest member in this particular series. In any event, having obtained a suitable resin of the kind herein contemplated, the next step is concerned with the oxyalkylation of such selected resin.

Previously reference has been made to the use of a single difunctional bis-phenol, as herein specified, or a single reactive aldehyde, or a single oxyalkylating agent. Obviously, mixtures of reactants may be employed, as, for example, a mixture of one or more of the difunctional bis-phenols previously described. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends upon the relative reactivity of the aldehyde. For that matter, one can co-resinify two different types of resins which actually would be a mechanical mixture, although such combination might exhibit somewhat different effects, due to the netting effect or some other reason. Similarly, as has been suggested, one might use a combination of oxyalkylating agents. For instance, one might partially oxyalkylate with ethylene oxide, and then finish off with propylene oxide. It is understood that resins, along with oxyalkylating derivatives derived from such plurality of reactants, instead of being limited to a single reactant in each of the three cases, are contemplated and herein included, for the reason that they are obvious variants.

Having obtained a suitable resin of the kind described, such resin is subjected to treatment with a low molal reactive olefine oxide, so as to render the product distinctly hydrophile in nature, as indicated by the fact that it becomes self-emulsifiable or miscible or soluble in water. The olefine oxides employed are characterized by the fact that they contain not over 4 carbon atoms and are selected from the class consisting of ethylene oxide, propylene oxide, butylene oxide, glycide and methylglycide, or certain obvious functional equivalents, such as certain halogen compounds hereinafter mentioned. Glycide may be, of course, considered as a hydroxypropylene oxide and methylglycide as a hydroxybutylene oxide. In any event, however, all such reactants contain the reactive ethylene oxide ring and may be best considered as derivatives of or substituted ethylene oxides. The solubilizing effect of the oxide is directly proportional to the percentage of oxygen present. Thus, ethylene oxide is much more effective than propylene oxide, and propylene oxide is more effective than butylene oxide. Hydroxypropylene oxide (glycidol) is more effective than propylene oxide. Similarly, hydroxybutylene oxide (methyl glycidol) is more effective than butylene oxide. Since ethylene oxide is the cheapest alkylene oxide available and is very reactive, it is definitely preferable, and especially in light of its high oxygen content. Propylene oxide is less reactive than ethylene oxide and butylene oxide is definitely less reactive than propylene oxide. On the other hand, glycide may react with almost explosive violence and should be handled with extreme care. Under certain circumstances, alternate reactants suggest themselves, but are not ordinarily of practical value; for instance, material such as ⌒pichlorohydrin, particularly where the phenol hydroxyl has been converted into a phenolate or alkoxide.

The oxyalkylation of resins of the kind herein contemplated is usually catalyzed by the presence of an alkali. Alkaline catalysts commonly employed include soaps, sodium acetate, sodium hydroxide, sodium methylate, caustic potash, etc. The amount of alkaline catalysts which may be added usually varies from .2% to 2%. The temperature employed may vary from room temperature to as high as 200° C. The reaction may be conducted with or without pressure. The pressure employed during oxyalkylation may vary from zero pressure to approximately 200 pounds gauge pressure (pounds per square inch).

It may be necessary to allow for the acidity of a resin in determining the amount of alkaline catalyst to be added in oxyalkylation. For instance, if a non-volatile, strong acid, such as sulfuric acid, is added to catalyze the resinification reaction, presumably after being converted into a sulfonic acid, then and in that event, it may be necessary and usually preferable to add an amount of alkali, equal stoichiometrically, to such acidity and include any added alkali over and above this amount as the alkaline catalyst.

Since the resins described in the aforementioned Balle patent may be comparatively low melting, as compared to many of those herein contemplated, it is desirable to conduct the oxyethylation, in presence of an inert solvent, such as xylene, cymene, decalin or the like. Since xylene is cheap and may be permitted to be present in the final product, particularly when used as a demulsifier, it is our preference to use xylene.

If xylene is used as an autoclave, as hereinafter indicated, the pressure readings, of course, represent total pressure, i. e., the combined pressure, due to xylene and also due to the ethylene oxide or whatever other oxyalkylating agent is used. Under such circumstances, it may be necessary at times to use somewhat higher pressures to obtain effective results. For instance, pressures up to 300 pounds along with correspondingly higher temperatures, if required.

If desired, however, even in the instance of high melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent, as well as a reactant in the earlier stages along with ethylene oxide. For instance, the powdered resin may be dissolved in propylene oxide, even though oxyalkylation is taking place to a greater or lesser degree. After a solution has been obtained which represents the original resin dissolved in propylene oxide or butylene oxide, or a mixture which includes the oxyalkylated product, one can add amounts of ethylene oxide to react with the liquid mass until solubililty is obtained. Since ethylene oxide is more reactive than propylene oxide or butylene oxide, the final water-soluble product may contain some unreacted propylene oxide or butylene oxide, which can be eliminated by volatilization, or distillation in any suitable manner.

Allowance must also be made for the presence of a solvent in the final product in relation to the hydrophile properties of the final product. The principle involved in the manufacture of the herein contemplated compounds, and particularly for use as demulsifying agents, is based on the conversion of a hydrophobe or non-hydrophile compound or mixture of compounds, into products which are distinctly hydrophile, at least to the degree that they are self-emulsifying, i. e., when shaken with water, they produce stable or semi-stable suspensions or the equivalent. In most instances, and in fact, almost invariably in demulsification, it is preferable to use a product having markedly enhanced hydrophile properties over and above the initial stage of self-emulsifiability. It is usually desirable to have a product which gives an apparently clear solution in water, i. e., homogeneous, although from a strictly colloidal standpoint, such solution might be better characterized as a sol. We have found, oddly enough, that in many instances it is desirable to go beyond the point where a homogeneous solution or sol is obtained. In other words, we have found that it is desirable to reach a stage where the hydrophile properties not only produce a clear solution of the compounds or the products themselves, but also a clear and apparently homogeneous solution, even if some water-insoluble solvent, such as xylene, is present in moderate amounts, for instance, approximately 5% to 25%.

The presence of xylene or an equivalent insoluble solvent, means that the initial hydrophile stage is passed before mere dilution in a test tube exhibits self-emulsification. For this reason, if it is desirable to determine the approximate point where self-emulsification begins, then it is better to eliminate the xylene or equivalent from a small portion of the reaction mixture, and test such portion for hydrophile properties. Naturally, such xylene-free resultant, may show initial or incipient hydrophile properties, whereas, in presence of xylene, such properties would not be noted. It is to be emphasized that hydrophile properties herein referred to are such as those exhibited by incipient self-emulsification and go through the range of homogeneous solubility or admixture with water, even in the presence of added water-insoluble solvent and minor proportions of common electrolytes as occur in oil field brines.

Our preference in contemplating the use of a resin, is to determine the hydroxyl value by the Verley-Bölsing method or its equivalent. Such resin as such or in the form of a solution, as described, is treated with ethylene oxide in the presence of one-half to 2% of sodium methylate as a catalyst. The conditions of reaction, as far as time or percent is concerned, are within the range previously indicated. With suitable agitation, the ethylene oxide, if added in molecular proportion, combines within a comparatively short time, for instance, 2 to 6 hours, but in some instances, may require as much as 8 to 24 hours. The completion of the reaction is usually indicated by the reduction or elimination of pressure, and the amount added is generally equivalent to a mole or two moles of ethylene oxide per hydroxyl radical. When the amount of ethylene oxide added is equivalent to approximately 150%, by weight, of the original resin, a sample is tested for incipient hydrophile properties by simply shaking up in water as is, or after the elimination of the solvent, if a solvent is present. The amount of ethylene oxide used, as a rule, varies from 100%, by weight, of the original resin, to as much as 5 or 6 times the weight of the original resin.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C., as a rule, and thus can be readily oxyalkylated, preferably oxyethylated, without the use of a solvent.

As a further example of the procedure, the following example and table are included:

A resin is prepared from bis-phenol C and formaldehyde in the manner described under the heading "Resin, Example 1." 123 pounds of such resin are mixed with 112 pounds of xylene and 45 pounds of diethyl Carbitol solvent (diethylene glycol diethylether) plus three pounds of sodium methylate. This charge is placed in an autoclave and stirred until homogeneous, warming to approximately 100° C., if required. Charged reaction mass is then reacted with 100 pounds of ethylene oxide at approximately 130° C., and at a pressure of approximately 115 pounds. The reaction should be complete in approximately an hour and a half. Further oxyethylation is conducted by adding four additional charges of 100 pounds each of ethylene oxide. The final product gave a milky emulsion in water, which is almost clear when diluted. The ratio of ethylene oxide added was approximately 3½ to one. The weight of the final product was approximately 712 pounds. The final product represented slightly less than 80% oxyethylated resin containing 15.75% of xylene and 6.3 diethyl Carbitol solvent.

Similar products were prepared from resins, as Examples 2, 3 and 4. Data in these with the preparation of these products, is summarized in the following table:

|  | Weight of C₂H₄O to give incipient emulsification | Weight of C₂H₄O to give fair or good emulsification | Weight of C₂H₄O to give complete solubility | Appearance of final product | Maximum temperature and pressure and time to reach final stage |  |
| --- | --- | --- | --- | --- | --- | --- |
| Resin, Ex. 1 | 1.6 parts ETO for 1 part resin. | 2.45 parts ETO for 1 part of resin. | Stopped at 3.52 parts ETO to 1 part resin. | Non-viscous amber colored oil-containing 22.1% solvents. | 145° C., 190 p. s. i., 6 hrs. | for 123 parts resin 2 parts xylene and 45 parts diethyl "Carbitol" solvent were used. |
| Resin, Ex. 2 | 0.7 part ETO for 1 part resin. | 1.36 parts ETO for 1 part resin. | 1.81 parts ETO for 1 part resin. | Viscous deep amber colored oil-containing 15% xylene. | 148° C., 150 p. s. i., 9 hrs. | for 147.3 parts resin 76 parts xylene was used as solvent. |
| Resin, Ex. 3 | 0.57 part ETO for 1 part resin. | 2.28 parts ETO for 1 part resin. | Never became completely soluble. Stopped at 3.91 parts ETO for 1 part resin. | Non-viscous water emulsifiable oil containing 18% xylene. | 155° C., 145 p. s. i., 10 to 15 hrs. per portion. | for 87.7 parts of resin 95 parts xylene was used as solvent. |
| Resin, Ex. 4 | 0.78 part ETO for 1 part resin. | 1.54 parts ETO for 1 part resin. | 2.39 parts ETO for 1 part resin. | Non-viscous, oily liquid containing 14% xylene. | 146° C., 140 p. s. i., 13 to 17 hours. | for 129.8 parts resin 73.2 parts xylene was used as solvent. |

Obviously, a variety of bis-phenols or equivalents may be used or a variety of aldehydes may be used, and also a variety of alkylene oxides. Furthermore, mixtures may be employed of two or more bis-phenols or two or more aldehydes, or two or more alkylene oxides.

Having thus described our invention, what we claim as new and desire to secure by Letters Patent is:

1. Hydrophile synthetic products; said hydrophile synthetic products being oxyalkylation products of: (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin derived by reaction between an aldehyde having but one functional group reactive with bis-phenol and a difunctional bis-phenol reactive towards aldehydes; said oxyalkylation resin being characterized by the introduction into the resin molecule at the phenolic hydroxyls of a plurality of divalent radicals having the formula $(RO)_n$, wherein R is a member selected from the class consisting of ethylene radicals, propylene radicals, butylene radicals, hydroxypropylene radicals and hydroxybutylene radicals; and $n$ is a numeral varying from 1 to 20; with the proviso that at least two moles of alkylene oxide be introduced for each phenolic nucleus.

2. The product described in claim 1, with the proviso that the alkylene oxide is ethylene oxide.

3. The product described in claim 1, with the proviso that the alkylene oxide is ethylene oxide, and the aldehyde is formaldehyde.

4. The product described in claim 1, with the proviso that the alkylene oxide is ethylene oxide, the aldehyde is formaldehyde, and the divalent alkyl radical uniting the two monocyclic phenol nuclei of the bis-phenol is a dimethyl methylene radical.

5. The product described in claim 1, with the proviso that the alkylene oxide is ethylene oxide, the aldehyde is formaldehyde, the divalent alkyl radical uniting the two monocyclic phenol nuclei of the bis-phenol is a dimethyl methylene radical, and the difunctional bis-phenol is of the following structural formula:

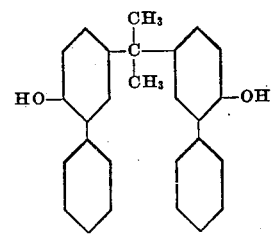

6. The product described in claim 1, with the proviso that the alkylene oxide is ethylene oxide, the aldehyde is formaldehyde, the divalent alkyl radical uniting the two monocyclic phenol nuclei of the bis-phenol is a dimethyl methylene radical, and the difunctional bis-phenol is of the following structural formula:

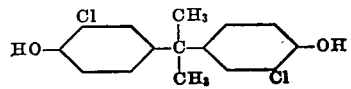

7. The product described in claim 1, with the proviso that the alkylene oxide is ethylene oxide, the aldehyde is formaldehyde, the divalent alkyl radical uniting the two monocyclic phenol nuclei of the bis-phenol is a dimethyl methylene radical, and the difunctional bis-phenol is of the following structural formula:

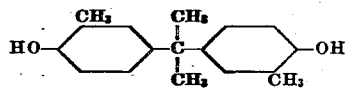

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | DeGroote | Apr. 13, 1937 |

OTHER REFERENCES

Ellis: The Chemistry of Synthetic Resins, vol. I, pp. 386–389; vol. II, p. 1559, Reinhold 1935.